United States Patent [19]

Fischbach

[11] 4,408,878
[45] Oct. 11, 1983

[54] METHOD AND APPARATUS FOR MEASURING EMISSIVITY

[75] Inventor: Jean-Paul F. Fischbach, Neupre, Belgium

[73] Assignee: Centre de Recherches Metallurgiques-Centrum voor Research in de Metallurgie, Brussels, Belgium

[21] Appl. No.: 216,866

[22] Filed: Dec. 16, 1980

[30] Foreign Application Priority Data

Dec. 17, 1979 [BE] Belgium ............................. 6/47038

[51] Int. Cl.³ .......................... G01J 5/04; G01J 5/10
[52] U.S. Cl. ........................................ 356/43; 374/9; 374/126
[58] Field of Search .................... 356/43, 45; 73/1 F, 73/355 EM, 15 R; 374/9, 126

[56] References Cited

U.S. PATENT DOCUMENTS 2,576,514 11/1951 Bianco et al. ........................ 356/43

FOREIGN PATENT DOCUMENTS 2123480 7/1977 Fed. Rep. of Germany ........ 356/45

Primary Examiner—Vincent P. McGraw
Attorney, Agent, or Firm—Holman & Stern

[57] ABSTRACT

A sensor unit comprising two pyrometers arranged in respective chambers disposed side-by-side and open at one end, one chamber being substantially totally reflecting and the other substantially totally absorbing. Periodically, the unit is advanced to the immediate proximity of the product, the signals from the pyrometers are received after the response time of the pyrometers has elapsed, and then the unit is withdrawn to its initial position. The signals from the pyrometers are processed so as to provide a signal representing the emissivity of the product.

11 Claims, 4 Drawing Figures

METHOD AND APPARATUS FOR MEASURING EMISSIVITY

BACKGROUND OF THE INVENTION

1. Field of the Invention

This invention relates to a method and apparatus for measuring, without contact, the emissivity of product which can be in moving.

2. Description of the Prior Art

Such a measurement is important because in any temperature determination by means of an optical pyrometer operating in a given spectral band, the signal delivered by the pyrometer can only be converted into temperature units if the emissivity of the product in this spectral band is known, as the signal delivered by the pyrometer is proportional to the emissivity. Because of this, it is apparent that the problem of making an exact continuous measurement of a temperature by means of an optical pyrometer is all the more difficult because the emissivity of the product can vary with time, owing to changes in its surface state, oxidation, the quality and the nature of the product, etc.

There are several different methods for measuring the emissivity of a product, but they generally have the drawbacks of extreme slowness, of being able to be operated only in the laboratory, of requiring destruction-sampling of the product, and often of requiring complementary processing of the signal received in order to obtain the required emissivity. One of these well-known methods is operated as follows.

An almost totally reflecting enclosure placed in contact with a surface constitutes a black body about said surface. The black body thus constituted about the said surface has the effect of making the value of the effective emissivity of said surface very close to unity because of the multiple reflections produced inside the reflecting enclosure. Let $V_1$ be the signal provided by a pyrometer situated inside the said enclosure and operating within a spectral band $\lambda$.

An almost totally absorbing enclosure placed in contact in the same position with the same surface allows no reflection. Let $V_2$ be the signal provided by a pyrometer operating within the same spectral band $\lambda$ and situated inside such an absorbing enclosure.

The emissivity of the said surface, when measured within the spectral band $\lambda$ considered, is a function of the ratio $V_2/V_1$ in accordance with a given known law. In addition, the signal delivered by the pyrometer situated in the reflecting enclosure enables the actual temperature of the product to be obtained, independently of its own emissivity.

BRIEF SUMMARY OF THE INVENTION

The present invention provides apparatus which enables the emissivity of a product to be measured, without the need for contact, by the two-enclosure method in an almost continuous manner. Movement of the product is allowed, and this enables measurements to be made during manufacture or treatment of the product.

The invention provides apparatus comprising:
(a) a "sensor" block constituted by two chambers disposed side-by-side, one of which is quasi totally reflecting and the other quasi totally absorbing, one wall of each of these chambers being constituted by the product whose emissivity is to be measured;
(b) two pyrometers, one per chamber, disposed in a similar manner for viewing the wall constituted by the product to be examined;
(c) means for displacing the sensor block and for placing it in proximity to the product to be examined (these means can be mechanical, pneumatic, or electrical);
(d) means for correcting and processing the signals delivered by the pyrometers in such a manner as to obtain a signal representative of the emissivity of the product concerned.

According to one embodiment of the invention, the means for displacing the sensor block or unit comprise a to-and-fro mechanism which functions periodically at a predetermined rate. These means notably comprise a limit switch system designed to provide a signal when the sensor unit has reached the required measuring position, and a return system designed to move the sensor unit into a withdrawn position in order to prevent overheating of the pyrometers.

According to a further embodiment of the invention, in order to ensure protection of the pyrometers, the sensor unit comprises cooling means using fluid circulation between the walls of the chambers disposed side-by-side.

It should also be noted that the double chamber form of the sensor unit also constitutes mechanical protection means for the pyrometers.

In order to prevent degradation of the surface state of the chamber walls, the apparatus preferably further comprises means for purging with nitrogen ($N_2$) when the sensor unit is in its withdrawn position.

The apparatus may advantageously include a guide tube for supporting the sensor unit during its displacement towards the product to be examined. If a measurement has to be made inside an enclosure, and in case of necessity, the guide tube is provided with an isolation valve for isolating the measuring equipment. This valve, which may be controlled manually, pneumatically, or electrically, enables the measuring equipment isolated in this manner to be serviced and if necessary dismantled. For the case in which such servicing is necessary, the apparatus preferably comprises a safety system designed to prevent operation of the displacement means when the valve in the guide tube is closed.

The guide tube is preferably provided externally with an annular water box at the position occupied by the reflecting and absorbing chambers when these are in their withdrawn position.

The present invention also provides a method for operating the above-described apparatus, comprising the following stages:
(a) the sensor block or unit fitted with its pyrometers is displaced in order to bring it either into the immediate proximity of or against the surface of the product whose emissivity is to be measured,
(b) after a time corresponding to the response time of the pyrometers, the signals delivered by the pyrometers are collected, are memorized, and are corrected in accordance with factors such as the reflection coefficient of the reflecting chamber and the distance between the chamber and product,
(c) the signals thus corrected are processed electronically in order to convert them into signals representative of the emissivity and temperature of the surface examined. (Such a conversion is carried out in accordance with a simple well-known calculation.)

In the case of high temperatures, this measurement can be carried out in an almost continuous manner, and in the case of low temperatures it can be carried out in a continuous manner.

The distance separating the sensor block or unit from the product to be examined should be as small as possible. In the case of an immobile product, the sensor unit is advantageously placed in contact with the product.

The instant at which the sensor unit reaches its measuring position is preferably determined by a signal emitted by a displacement measuring device.

When the signals delivered by the pyrometers have been memorized or recorded, the sensor unit is returned to its withdrawn position in order to prevent overheating of the pyrometers.

In particular, the following are made possible by the present invention:

measuring the emissivity of a product leaving a pickling or cleaning furnace, without contact and at a required rate, which can be very high, obtaining the true temperature of a product independently of its own emissivity, automatically correcting the signal continuously delivered by an optical pyrometer working within the same range of wavelengths as the sensor.

BRIEF DESCRIPTION OF THE DRAWINGS

The accompanying drawings, given by way of non-limiting example, diagrammatically illustrate one embodiment of the apparatus according to the invention.

In the drawings.

DETAILED DESCRIPTION

Figure 1:
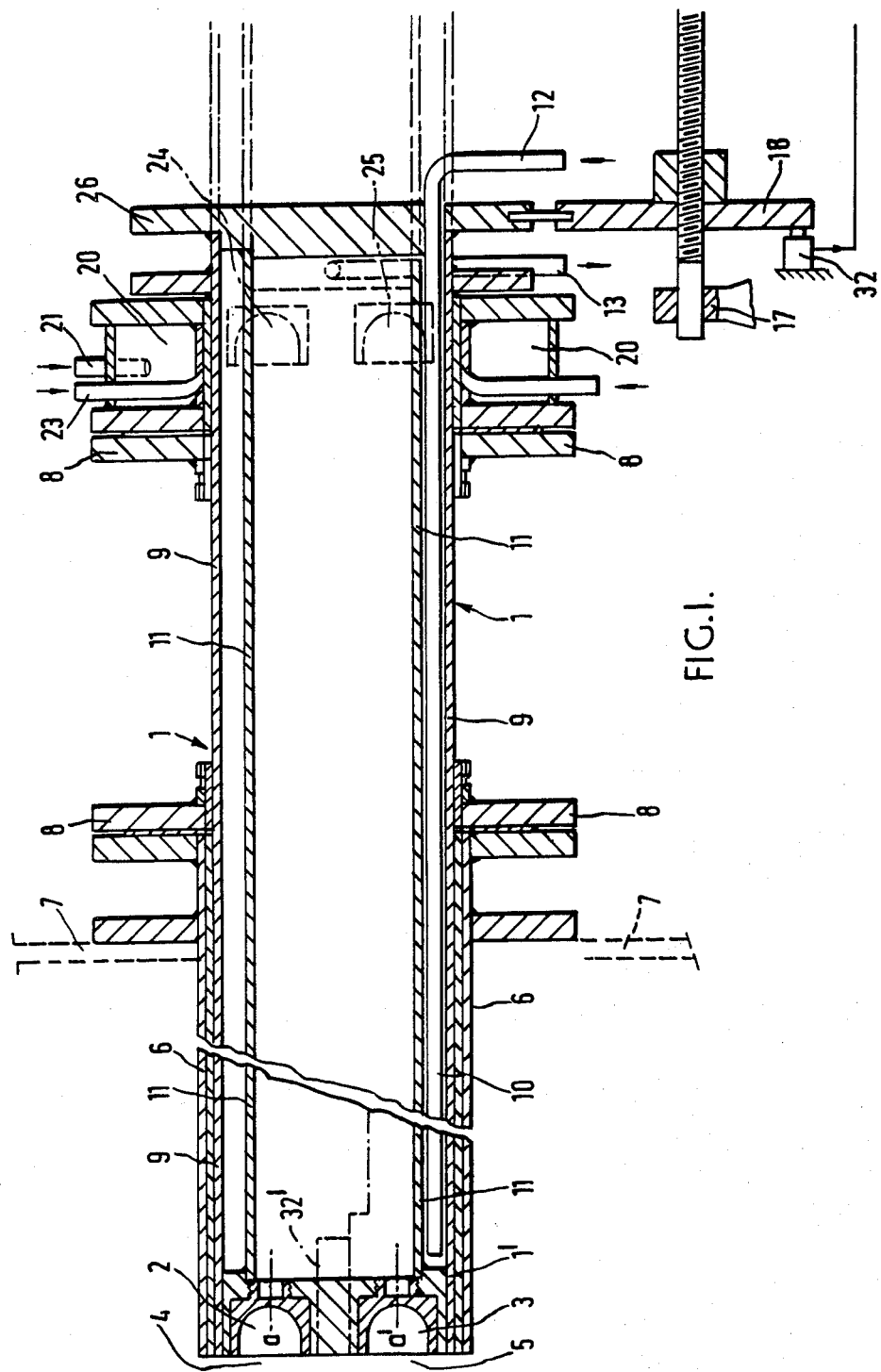
FIGS. 1 and 2 together constitute a cross-sectional view of the apparatus taken on a horizontal plane passing through the longitudinal axis.

The apparatus illustrated comprises a mobile support 1 provided at its end with a sensor unit 1' constituted by two chambers 2,3 disposed side-by-side, of which the chamber 2 is almost totally reflecting and the chamber 3 is almost totally absorbing. The open end 4 of the chamber 2 and the open end 5 of the chamber 3 are to be covered by a product whose emissivity is to be measured.

The apparatus also comprises two pyrometers a and a', one per chamber, disposed in a similar manner for viewing the product to be examined. Only the axes of the pyrometers a,a' are indicated, the remainder being omitted for reasons of clarity.

A guide tube 6 allows displacement of the unit 1' towards and away from the product to be examined. FIG. 1 is concerned with measurement inside a furnace, whose wall 7 is shown, through which the sensor unit is inserted. In such a case, the guide tube 6 is fitted with an isolation valve 8.

The support 1 has an outer casing 9, and a dip tube 10 for cooling by circulating air or water between the casing 9 and a longitudinal inner tube 11. The dip tube 10 is fed by way of a conduit 12 and the coolant is discharged by way of a conduit 13.

Figure 2:
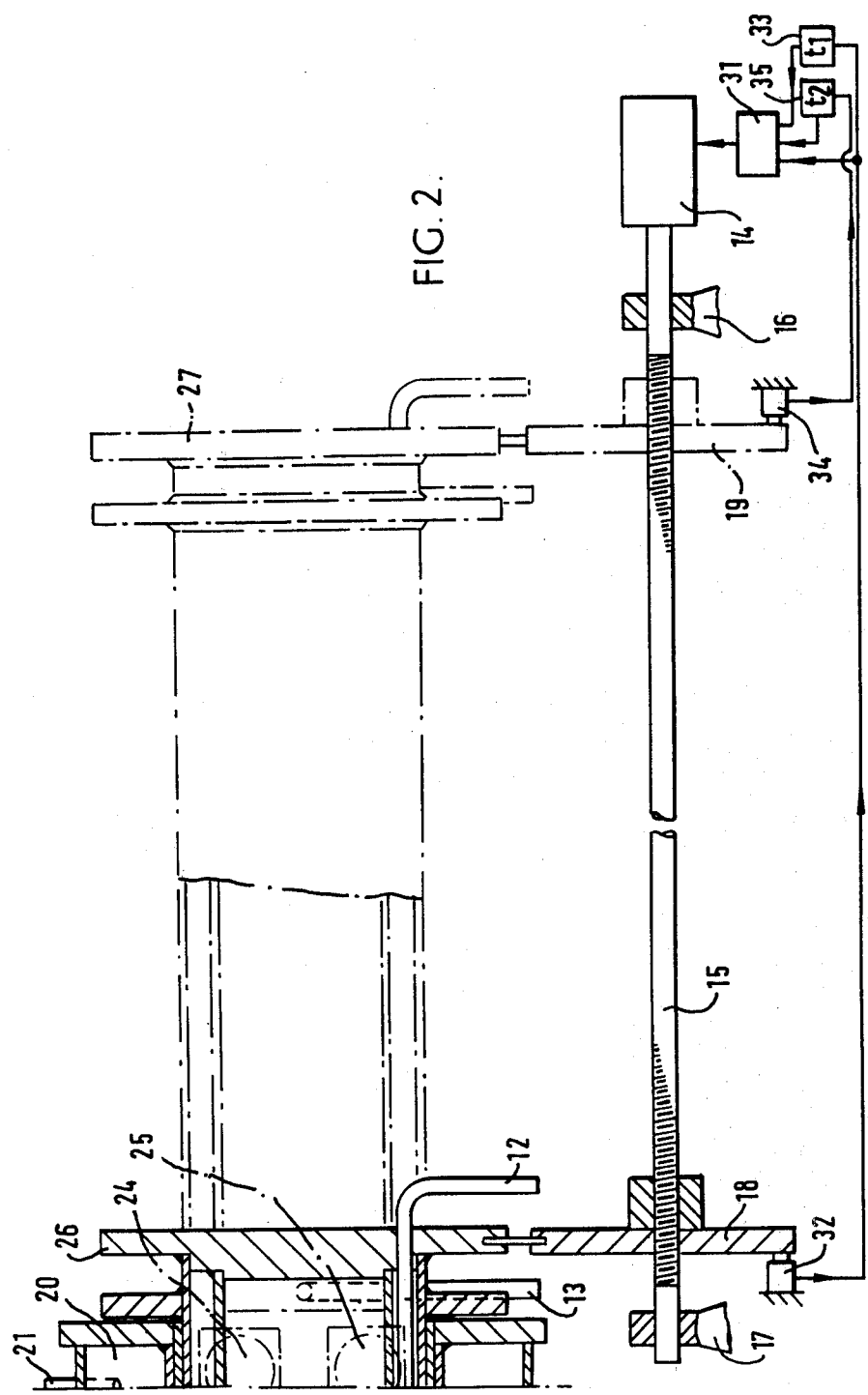

A to-and-fro mechanism for periodic operation of the unit 1' at a predetermined rate is seen in FIG. 2. This mechanism displaces the sensor unit 1' as far as its measuring position, then returns it to its withdrawn position in order to prevent overheating of the pyrometers. The mechanism comprises a (reversible) drive motor 14, a screwthreaded transmission shaft 15 mounted in two bearings 16 and 17, and a coupling disc 18 threaded on the shaft 15. The dash-dotted lines 19 represent the position of the disc 18 when the sensor unit 1' is in the withdrawn position.

Figure 3:
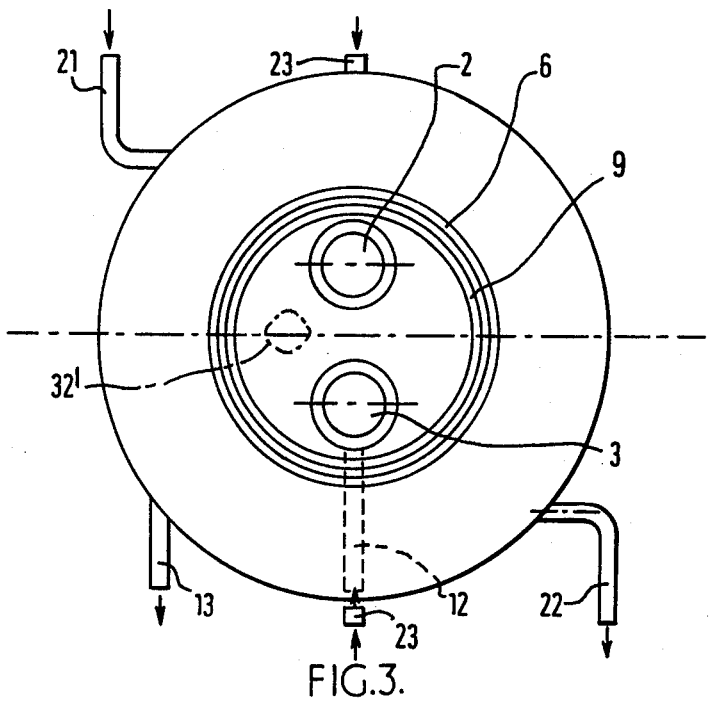
FIG. 3 is an end view of the apparatus as viewed from the left in FIG. 1.

The guide tube 6 is provided externally with an annular water box 20 (or cooling jacket) located at the position occupied by the chambers 2 and 3 when the sensor unit 1' is in the withdrawn position. Water enters in accordance with the arrow 21, and leaves in accordance with the arrow 22 (FIG. 3).

In proximity to the water box 20 there are two conduits 23 for feeding nitrogen for purging purposes in order to prevent any degradation of the surface state of the walls of the chambers 2 and 3 when in the withdrawn position (dash-dotted lines 24 and 25).

The end of the support 1 that is remote from the chambers 2 and 3 is provided with a coupling disc 26 designed to follow the movement imposed by the disc 18 keyed on to the shaft 15 of the motor 14. The dash-dotted lines 27 (FIG. 2) represent the situation of the disc 26 when the chambers 2 and 3 are in their withdrawn position.

The periodic displacement of the unit 1' occurs in the following manner. With the disc 18 in the withdrawn position 19, a control unit 31 controlling the motor 14 is switched on and this causes the motor 14 to rotate the shaft 15 so as to advance the disc 18 towards the product. When the disc 18 reaches the fully advanced position shown in FIGS. 1 and 2 (at which the unit 1' will be in the immediate proximity of the product) it comes into contact with a limit switch 32 which emits a signal that passes to the control unit 31 and stops the motor 14. Additionally or alternatively, a proximity probe 32' at the front of the unit 1' may provide an equivalent signal for the same purpose when the unit 1' approaches the product; this probe 32' will also prevent the advance of the unit 1' if the isolation valve 8 is closed. The signal from the switch 32 (or the probe 32') also starts a timer 33, which emits a signal after a short delay $t_1$ (e.g. 10 s); this signal causes the control unit 31 to reverse the motor 14 in order to withdraw the disc 18 and with it the unit 1'. When the disc 18 reaches the position 19 it actuates a limit switch 34 which emits a signal that passes to the control unit 31 and stops the motor 14. The signal also starts a timer 35 which, after a given period $t_2$ (e.g. 10 min), emits a signal which causes the control unit 31 to reverse the motor 14 in order to advance the disc 18 again, thereby initiating the above-described cycle again.

Figure 4:
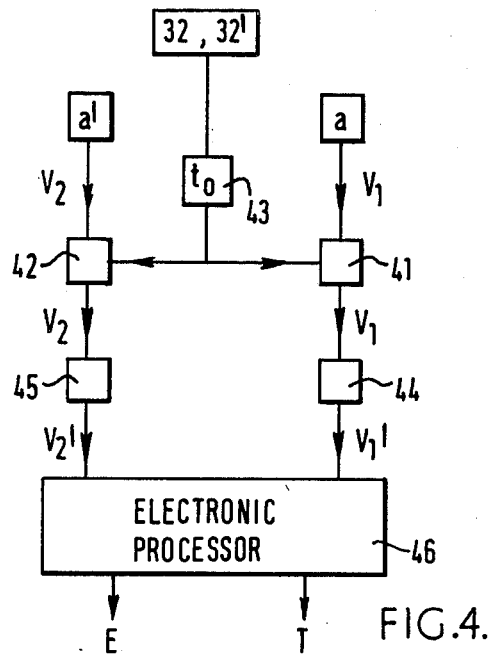
FIG. 4 is a block diagram of a circuit for processing the pyrometer signals in the apparatus.

The temperature T of the product and its emissivity E may be obtained by means of the circuit illustrated in FIG. 4. Respective signals $V_1$, $V_2$ from the photometers a,a' are transmitted to respective stores 41,42. Entry to the stores is blocked until a signal is emitted by a timer 43 (after a time $t_o$ equal to 5 seconds, for instance) which is started by the signal from the limit switch 32 or probe 32'. The signals $V_1$, $V_2$ from the stores 41,42 are corrected in respective correction units 44,45 by correction factors related to the reflection coefficients of the chambers 2,3 and the minimum distance between the unit 1' and the product (inter alia). The corrected signals $V_1'$, $V_2'$ are fed into an electronic processor 46 which provides the emissivity E (a function of $V_1'/V_2'$) and the temperature T (a function of $V_1'$).

I claim:

1. Apparatus for measuring the emissivity of a surface of a product, comprising (a) an elongated support member, a sensor unit mounted at one end of said support member comprising two chambers disposed side-by-side, one of said chambers being substantially totally reflecting and the other being substantially totally absorbing, the chambers being open at one end facing outwardly of said one end of said support member so that they are exposable to the product, and a pyrometer arranged in each respective chamber and directed towards the open end thereof, and (b) displacement means operatively engaging the other end of said support member for advancing said support member and sensor unit towards the product, placing it in proximity to the product, and withdrawing it from the product.

2. Apparatus as claimed in claim 1, wherein said displacement means comprises automatic means for periodically advancing the sensor unit from a retracted position, automatic means for stopping the advance when the sensor unit is in predetermined proximity to the product, and automatic means for returning the sensor unit to said retracted position.

3. Apparatus as claimed in claim 1, and further comprising means for processing the signals emitted by the pyrometers to provide a signal representative of the emissivity of the product.

4. Apparatus as claimed in claim 1, and further comprising means for conducting a cooling fluid through said support member to said sensor to cool the chambers.

5. Apparatus as claimed in claim 1, and further comprising means for purging said chambers with nitrogen when said sensor unit is withdrawn from the product.

6. Apparatus as claimed in claim 1, and further comprising a guide means at least partially enclosing said support member for guiding said support member during said advancement and withdrawal, and an isolation valve mounted on said guide means for isolating the sensor unit from the product when said unit is withdrawn from the product.

7. Apparatus as claimed in claim 6, and further comprising a safety system operatively connected to said displacement means and said isolation valve to prevent the advancement of the sensor unit when said isolation valve is closed.

8. Apparatus as claimed in claim 6, and further comprising an annular cooling jacket surrounding said guide means at the position occupied by the chambers when the sensor unit is withdrawn from the product.

9. Apparatus as claimed in claim 2 wherein said support member is a tubular member and further comprising a guide means enclosing said tubular member in telescoping engagement therewith, an inner tubular member within said tubular member in coaxial spaced relationship therewith to provide a sealed cylindrical annulus, coolant ducts communicating with said annulus to conduct coolant through said annulus to cool said chambers, an annular cooling jacket surrounding said guide means at the retracted position of said chambers when said sensor unit is withdrawn from the product, and wherein said displacement means comprises a motor, control means for operating said motor, a drive shaft operatively connecting said motor to said tubular support member, a first and second limit switch fixedly mounted with respect to said apparatus and operatively connected to said control means to respectively detect the advanced and retracted positions of said sensor unit and deenergize said motor at said positions, a first timer operatively connected to said first limit switch and said control unit to energize said motor after a pre-set time delay to withdraw said sensor, a second timer operatively connected to said second limit switch and said control unit to energize said motor after a pre-set time delay to advance said sensor unit, and electronic means operatively connected to said pyrometers to receive and convert the signals from said pyrometers to signals representing emissivity and temperature of the product.

10. A method of measuring the emissivity of a product comprising, (a) advancing a sensor unit having a reflecting chamber, an absorbing chamber, and a pyrometer for each chamber into immediate proximity of the product, (b) detecting the emissivity with each pyrometer, (c) feeding the signals from each pyrometer, after a predetermined delay at least equal to the response time of the pyrometers, to respective correction units, (d) correcting said signals by correction factors including the reflection coefficients of the chambers and the distance between the chambers and the product, (e) feeding the corrected signals to an electronic processor, and (f) processing the corrected signals to convert them into signals representing the emissivity and temperature of the product.

11. A method as claimed in claim 10 and further comprising withdrawing the sensor from the position of proximity to the product after the signals have been received.

* * * * *